Jan. 3, 1956          J. E. ODLE          2,729,140
STEREO-PHOTOGRAMMETRIC PROJECTION PLOTTING APPARATUS
Filed July 9, 1952
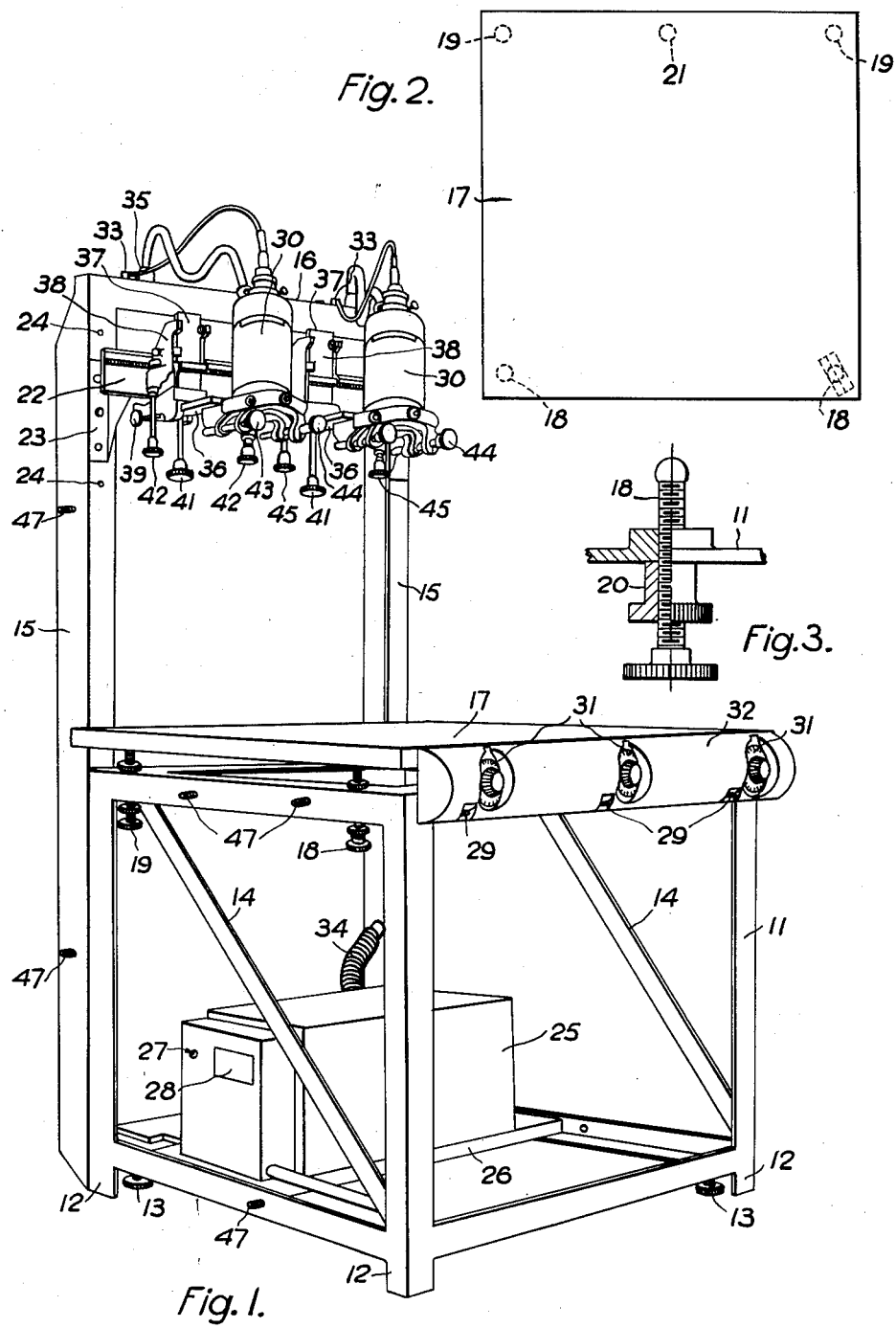
INVENTOR
John Elsden Odle
BY
ATTORNEY

United States Patent Office 2,729,140
Patented Jan. 3, 1956

2,729,140

STEREO-PHOTOGRAMMETRIC PROJECTION PLOTTING APPARATUS

John Elsden Odle, Pinner, Middlesex, England

Application July 9, 1952, Serial No. 297,871

9 Claims. (Cl. 88—24)

This invention relates to stereo-photogrammetric plotting apparatus of the projection type in which transparencies, usually diapositives and usually on a reduced scale, of aerial or like photographs are projected on to a projection table and examined stereoscopically in pairs, e. g. anaglyphically.

For known reasons it is desirable to project a whole succession of such photographs on the one table and if they have adequate overlap and are projected in the correct relationship each and any adjacent pair will permit stereoscopic observation of the mutually overlapping areas. Correct relationship involves bringing the datum plane of the projected images into parallelism with the table stop. In the apparatus as hitherto constructed, the table is levelled for convenience when the apparatus is set up, and adjustment of the datum plane is effected by adjusting the bar in relation to the table. Practical difficulties limit the extension of the table and support bar due to lack of ridigity and sagging of both table and bar, the necessary accuracy in the flatness of the table and straightness of the bar being of the order of .01 mm. The established practice is normally limited to a table 7 feet long permitting from 7 to 10 photographs to be projected. Methods exist for joining two such tables and bars in alignment, but the rigidity and accuracy of the junction are unsatisfactory having regard to the accuracy necessary.

The purpose of the present invention is to provide a unit system of construction which overcomes the difficulties due to lack of rigidity; quite short units can be provided which themselves may be useful as will be pointed out below.

According to the invention in each unit the bar is rigidly fixed to the supporting framework and adjustment to bring the table top and datum plane into parallelism is effected by adjusting the table in relation to the framework and bar. To allow units to be conveniently associated, the bar and table are made of substantially equal length and the supporting framework does not extend substantially beyond the ends of the table and bar.

Since both the table proper and bar of each unit are short they can be made very stiff and also flat and straight respectively without undue difficulty. The frameworks of the units are provided with the same form of adjustment such as screwed feet so that after setting up units side by side, the bars over the whole length can be aligned with the necessary degree of accuracy by the aid of known means such as the optical collimating sight and target, or stretched wire and microscope. Desirably the frameworks may be secured together and some means of connection between the bars may be provided which enables a projector to be run over or on to the junction. Two tables, say the end ones, are adjusted in relation to the datum plane of the projected images and thereafter those between can be brought into the same plane, intermediate checks being taken if desired from the images.

The accuracy of flatness of the complete assembly of tables is more important than the alignment of the bar, and in the present unit system, the table levelling is made easier by the absence of sag and instability experienced on larger tables.

The invention will be further described with reference to an example illustrated in the accompanying drawings, in which:

Figure 1 is a perspective view of one unit,

Figure 2 is a detail plan view showing the actual table and the disposition of the adjusting screws, and Figure 3 is a detail section of one of the adjusting screws.

A preferred construction of unit is of such size as to accommodate two or preferably three projectors, with a table say three feet square.

In the illustrated example, the main framework is a skeleton structure 11, conveniently of metal angles, approximately cubic in form with short feet 12. Each foot is shown with an adjacent screw adjustment 13 for levelling the framework. The cubic structure 11 has diagonal braces 14 across the two end squares and two angle or hollow standards 15 rising at the back and joined at the top by a cross bar 16. The table proper 17 which may be a ribbed casting is supported above the top square of the cubic structure 11 by levelling screws provided with lock nuts 20. Advantageously there may be one screw 18 near each front corner, one 19 near each back corner and one 21 midway along one side, say the back. Levelling then may be effected by this mid screw 21 and those 18 at the front corners. In accordance with known principles these screws may be spherical ended, and engage the underside of the table, one in a socket, one in a V-groove and the other on a flat. The other two 19 then being used to support the table against accidental disturbance. A bar 22 for the projectors is supported from the standard 15 by bolted-on brackets 23 and provision may be made by extra holes 24, to bolt the brackets on at several different levels. The framework may be of steel or aluminium alloy and the table of iron or aluminium alloy.

A box 25 within the cubic structure 11 on cross bars 26 on the base-square accommodates electrical parts such as a main switch 27, fuses in a compartment 28, a transformer for the projector and other lamps and a blower for cooling the projectors. Switches 29 and regulators 31 for the lamps may be supported in a hollow cross member 32 along the top front edge of the cubic structure and the leads to and from the transformer, lamp switches and regulators, and for sockets 33 on the top cross-bar 16 may be accommodated in one standard 15 while a duct 34 leading from the blower to outlet connections 35 on the top cross-bar may be accommodated in the other standard.

The projector bar 22, the projectors, their mounting and adjustments may be of the known kind.

Thus in Figure 1 in which two projectors 30 are shown in position, each is mounted by means of an arm 36 extending from a vertically adjustable slide 37 on a carriage 38 running on the bar 22. A knob 39 controls a rack and pinion or like feed whereby the arm 36 can be moved horizontally, perpendicularly to the bar, a second knob 41 controls another rack and pinion or like feed whereby the slide 37 can be raised or lowered in relation to the carriage 38, and a third knob 42 controls a third rack and pinion or like feed whereby the carriage 38 can be traversed along the bar 22. The projector itself is provided with adjustments for rotating the transparency and for tilting the objective, controlled by knobs 43 and 44, 45.

As will be apparent from the drawings, the table 17 of the unit does not extend laterally beyond the ends of the bar 22. Consequently by placing several of the units side by side and levelling their frameworks by the aid of the screw adjustment adjacent the feet 13, the bars 22 can be accurately aligned and the units can then be firmly secured to one another by fixing devices exemplified by the bolts 47. Thereafter the several tables 17 can be separately levelled and aligned by the screws 18, 19 and 21 which are then locked by the nuts 20.

A single unit as a whole, with two or three projectors, also has many practical uses for the study and measurement of individual stereoscopic pairs which constitute a large and separate part of the plotting procedure.

What I claim is:

1. A projection unit for use in stereo-photogrammetric plotting by projection, comprising a projector-supporting bar of a length to accommodate a plurality of projectors spaced thereon to project a corresponding number of stereoscopically related transparencies, a supporting framework fixed to said bar to form a rigid unitary structure therewith, a flat-topped table supported in said framework in a position generally to receive images projected by projectors supported by said bar, and means for adjusting said table in relation to said framework, whereby the table top can be brought into precise parallelism with the datum plane of such images notwithstanding the rigid relationship to said framework and bar.

2. A unit as set forth in claim 1 wherein said bar and table are of substantially equal length and said framework does not extend substantially beyond the ends of the table and bar, whereby a plurality of said units can be associated side by side with their table tops substantially contiguous.

3. A unit as set forth in claim 2, which comprises levelling means for the supporting framework, whereby when a plurality of said units are positioned in side by side relationship, the alignment of their projector-supporting bars is facilitated.

4. A unit as set forth in claim 2 also comprising means on said supporting framework whereby it can be firmly secured to the framework of another similar unit placed beside it.

5. A unit as set forth in claim 2 also comprising levelling means for the supporting framework and securing means on a side of the framework, whereby when a plurality of said units are positioned in side by side relationship, the alignment of the projector-supporting bars is facilitated and they can be firmly secured together.

6. A projection unit for use in stereo-photogrammetric plotting, comprising a skeleton framework consisting of a substantially cubic portion with vertically rising uprights at its rear, a projector-supporting bar fixed to said uprights to form a rigid structure therewith, levelling screws carried by said framework at the top of said cubic portion, and a flat-topped table, of substantially the same size as the top of said cubic portion, adjustably supported by said levelling screws.

7. A unit as set forth in claim 6 wherein said levelling screws comprise one at each corner of the table top and at the center of one side thereof.

8. A unit as set forth in claim 6 wherein said framework comprises a short foot at each corner of the cubic portion, and a levelling screw adjacent at least one said short foot.

9. A unit as set forth in claim 6 also comprising securing means on one side of said framework whereby it can be secured to the framework of a second similar unit placed in operative alignment adjacent thereto.

References Cited in the file of this patent

UNITED STATES PATENTS

| | | |
|---|---|---|
| 1,980,657 | Bauersfeld | Nov. 13, 1934 |
| 2,079,090 | Gruber | May 4, 1937 |
| 2,200,594 | Diggins et al. | May 14, 1940 |
| 2,451,031 | Kelsh | Oct. 12, 1948 |
| 2,461,567 | Pennington | Feb. 15, 1949 |
| 2,492,870 | Kelsh | Dec. 27, 1949 |
| 2,552,975 | Kelsh | May 15, 1951 |